(12) United States Patent
Jarraya et al.

(10) Patent No.: US 12,495,294 B2
(45) Date of Patent: Dec. 9, 2025

(54) MULTI-TENANCY TRUSTED DATA ANONYMIZATION

(71) Applicant: Telefonaktiebolaget LM Ericsson (publ), Stockholm (SE)

(72) Inventors: Yosr Jarraya, Montreal (CA); Makan Pourzandi, Montreal (CA); Harri Hakala, Turku (FI); Bernard Smeets, Dalby (SE); Tommy Arngren, Södra Sunderbyn (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 270 days.

(21) Appl. No.: 17/787,711

(22) PCT Filed: Jan. 14, 2020

(86) PCT No.: PCT/IB2020/050275
§ 371 (c)(1),
(2) Date: Jun. 21, 2022

(87) PCT Pub. No.: WO2021/144608
PCT Pub. Date: Jul. 22, 2021

(65) Prior Publication Data
US 2023/0022539 A1  Jan. 26, 2023

(51) Int. Cl.
*H04W 12/02* (2009.01)

(52) U.S. Cl.
CPC .................................. *H04W 12/02* (2013.01)

(58) Field of Classification Search
CPC ............... H04L 2209/42; H04L 63/061; G06F 21/6254; H04W 12/02
See application file for complete search history.

(56) References Cited

U.S. PATENT DOCUMENTS

2017/0317984 A1 * 11/2017 Ollikainen ............ H04W 12/02
2017/0353319 A1 * 12/2017 Scarlata .................. H04L 9/302
(Continued)

FOREIGN PATENT DOCUMENTS

EP         3713260 A1 *  9/2020
WO      2016/057347 A1   4/2016
(Continued)

OTHER PUBLICATIONS

International Search Report and Written Opinion dated Oct. 5, 2020 issued in PCT Application PCT/IB2020/050275, consisting of 12 pages.
(Continued)

*Primary Examiner* — Hee Soo Kim
(74) *Attorney, Agent, or Firm* — Weisberg I.P. Law, P.A.

(57) ABSTRACT

A security management system including a first TEE and a common TEE is provided. The first TEE is a secured environment for data associated with a first entity. The common TEE is a secured environment for data associated with any one of a plurality of entities. First anonymization
(Continued)

parameters are shared between the first TEE and the common TEE. The first anonymization parameters are based at least in part on at least one privacy requirement of the first entity and at least one utility requirement of the security management system. The security management system includes processing circuitry configured to: anonymize first data associated with the first entity based at least in part on the first anonymization parameters, analyze at least the anonymized first data for performing data investigation, and generate analysis results based at least in part on the analysis of at least the anonymized first data.

18 Claims, 7 Drawing Sheets

(56) References Cited

U.S. PATENT DOCUMENTS

| | | | |
|---|---|---|---|
| 2018/0137299 A1 | 5/2018 | Porter et al. | |
| 2018/0255023 A1 | 9/2018 | Whaley et al. | |
| 2020/0394334 A1* | 12/2020 | Bulut | G06N 5/048 |
| 2021/0049299 A1* | 2/2021 | Pacella | H04L 9/0897 |
| 2021/0150269 A1* | 5/2021 | Choudhury | G06V 30/1985 |
| 2021/0248253 A1* | 8/2021 | Fuhry | G06F 21/53 |
| 2022/0391537 A1* | 12/2022 | Gotthardt | H04W 12/02 |
| 2025/0225277 A1* | 7/2025 | Morris | G06F 21/6254 |

FOREIGN PATENT DOCUMENTS

| | | | | |
|---|---|---|---|---|
| WO | 2017/187207 A1 | | 11/2017 | |
| WO | 2019/116112 A1 | | 6/2019 | |
| WO | WO-2023099895 A1 | * | 6/2023 | ........... H04L 9/0833 |
| WO | WO-2025032246 A1 | * | 2/2025 | ............ G06N 20/00 |

OTHER PUBLICATIONS

Karen Kent et al., Guide to Computer Security Log Management; Recommendations of the National Institute of Standards and Technology, Technology Administration, US Department of Commerce, Sep. 2006, consisting of 72 pages.

Ching-Hao Mao et al., MalSpot: Multi2 Malicious Network Behavior Patterns Analysis; In Pacific-Asia Conference on Knowledge Discovery and Data Mining, Institute for Information Industry, 2014 Taipei, Taiwan; Springer, consisting of 14 pages.

Sean Thorpe et al., Towards a Forensic-Based Service Oriented Architecture Framework for Auditing of Cloud Logs, In Services (Services), 2013 IEEE Ninth World Congress on IEEE, consisting of 9 pages.

European Commission, Communication from the Commission to the European Parliament and the Council, Data Protection Rules as a Trust-Enabler in the EU and Beyond—Taking Stock, Brussels, Jul. 24, 2019, consisting of 20 pages.

Caida, Center for Applied Internet Data Analysis; Anonymization Tools Taxonomy; https://www.caida.org/tools/taxonomy/anonymization.xml, Oct. 25, 2019, consisting of 4 pages.

* cited by examiner

MULTI-TENANCY TRUSTED DATA ANONYMIZATION

CROSS-REFERENCE TO RELATED APPLICATIONS

This application is a Submission Under 35 U.S.C. § 371 for U.S. National Stage Patent Application of International Application Number: PCT/IB2020/050275, filed Jan. 14, 2020 entitled "MULTI-TENANCY TRUSTED DATA ANONYMIZATION," the entirety of which is incorporated herein by reference.

TECHNICAL FIELD

Wireless communication and in particular, to multi-entity data anonymization and analysis.

BACKGROUND

Electronic data is a resource used by entities and/or security professionals to perform various actions such as forensic investigations, understanding systems' alerts, analyzing users' behaviors and learning about vulnerabilities and misconfigurations of the deployed network environment. Sharing data helps improve accuracy of such actions. Although there exist efforts and attempts to provide mechanisms for data sharing of data belonging to various data owners such data sharing does not happen enough due to one or more of the following factors.

First, data owners may be reluctant to share their data, specifically because of the risks of Personally Identifiable Information (PII) breaches where an entity may gain unauthorized access to certain information. For example, internet of things (IoT) devices may collect information such as personal data which may include user identity, location, energy consumption, and telephone numbers. This information can reveal a lot about the user's daily life activities (e.g., using washing machines, watching TV, and leaving or returning home). Such personal data may be transmitted from the customer's premises to services located in a network cloud. This transmission of personal data is a privacy concern for the device's owners. Additionally, network observers can gather private and sensitive information about home activities by analyzing internet traffic from smart homes containing IoT devices as users may not be able to block outgoing traffic from their home since doing so may render the IoT devices unusable.

In contrast to the various privacy issues related to the transmission and/or collection of personal data, there is a need for gathering and analyzing data including personal data from different IoT devices belonging to the same customer and data across domains in a central point in order to enable analysis such as one or more of compliance status verification, security attack detection, infected devices detection, verification of information on configuration, and KPIs analysis, which may be beneficial to mitigate more subtle and/or harder to detect network threats.

Second, privacy protection laws further complicate the potential issues with the handling of personal data. For example, the European General Data Protection Laws (GDPR) may impose strict requirements on the manner in which businesses/entities collect, store and manage personal data of citizens of the European Union. Personal data may include one or more of a name, email, address, date of birth, personal interests, unique identifiers, digital footprints, etc. Furthermore, the data controller (i.e., entity handling the data) is accountable for any data privacy breach after sharing the data with a third-party processor. The GDPR may mandate the data controllers' accountability and force them to demonstrate their responsibilities in preserving user's privacy in the handling of user data. For example, the GDPR states that data controller may define appropriate methods and measures for data protection and compliance by default and design, and states that where processing is to be carried out on behalf of a controller, the controller may have to use only processors providing sufficient guarantees to implement appropriate technical and organizational measures in such a manner that processing may have to meet the requirements of GDPR regulations to help ensure the protection of the rights of the data subject." Therefore, data controllers have the responsibility of ensuring the protection of the data when outsourced to a third-party data processor.

When it comes to data belonging to different customers, data may contain privacy- or business-critical information, and potentially sharing/collecting data from different customers can create across customers privacy breaches. One possible process for address this risk is to analyze the security locally within each administrative domain. However, this process is usually inefficient and likely cannot detect subtle attacks. Subtle attacks may generally refer to attacks that are likely not immediately identifiable by known methods as these attacks may only cause minor security events such an attacker one or more of testing known passwords, probing for services, testing new exploits, etc. Such attacks may ultimately be identified by known methods based on accumulation of minor security events over a long period. As such, dealing with customers' related information without proper protection or using data from different customers may breach privacy laws.

Data pseudonymization may be used to protect privacy where data pseudonymization may be defined as the processing of personal data in such a manner that the personal data can no longer be attributed to a specific data subject without the use of additional information, provided that such additional information is kept separately and is subject to technical and organizational measures to ensure that the personal data are not attributed to an identified or identifiable natural person. In another example, data anonymization may be defined as the process by which personal data is irreversibly altered in such a way that a data subject can no longer be identified directly or indirectly from the anonymized data. As used herein, data anonymization refers to the technique of processing the data to change it in a way that prevents the identification of information in the data.

Data anonymization can be used to help protect data from privacy and confidentiality breaches. Data anonymization techniques usually provide a tradeoff between privacy and utility as higher privacy for the data tends to lead to lower utility in analyzing the data. However, existing anonymization tools are inflexible as they are kind of ready-made and one-size-fits-all tools. Also, there may exists an interest-gap between the data processors and data owners. For example, data owners may try to enforce their privacy requirements while disregarding the data processors' (i.e., entity that processes the data) requirements (i.e., in most cases data owners enforce strict privacy requirements for all use cases. As a result, data owners may decide not to share their data, or the data become "useless" for analysis after anonymization when consider from the data processors' point of view. Further, data processors may not have any role in the anonymization process such that they are not able to reflect their requirements nor object if the anonymization process sacrifices too much from the data utility.

Trusted Execution Environment (TEE)

One approach to help secure data is referred to as a TEE. The TEE is a secure area in the main processor or memory that provides one or more guarantees with respect to confidentiality and integrity for data and code loaded within the TEE. The TEE solution may provide one or more of: isolated execution, Secure Storage, Remote Attestation, Secure Provisioning and Trusted Path. In the case of unikernels, TEEs may offer additional protection for security-sensitive information against privileged users, especially in the case of virtualized environments. There are a number of TEEs available, for example:

ARM TrustZone (TZ)—ARM TZ is a security architecture based on Security Extensions that enables a system and software to be partitioned into Secure "worlds" and Normal (non-secure) worlds. At a hardware level, each physical processor core has two virtual cores, one considered secure (i.e., part of the secure world) and one non-secure (i.e., part of the non-secure world). At a software level, secure software can access both secure and non-secure memory and resources, while normal (un-secure) software can only access non-secure memory and resources.

Intel Software Guard eXtensions (SGX)—Intel SGX is a mechanism that enables the creation of TEEs. Intel SGX may require underlying hardware that supports SGX (Mainboard with SGX-BIOS and Intel SGX-enabled CPU) and software applications developed using the Intel SGX-SDK which enable the usage of the SGX API. The user application uses SGX to create a protected area referred to as an enclave. Enclaves are used to create trusted execution environments (TEE). An enclave is an isolated region of code and data within the address space for a specific software application. Further, only code that runs, i.e., is executed, within the enclave can access data within the same enclave.

Some Anonymization Methods

Some anonymization tools for network data as described below, which placed into two categories:

1. Cryptographic-based network trace anonymization tools: Some of the network anonymization tools in this category (e.g., AnonTool, CANINE, CoralReef, FLAIM, tcpdpriv) use cryptographic-based anonymization methods such as prefix-preserving, hashing, truncation and permutation in order to anonymize the data. Those tools focus on TCP dump data and anonymize the TCP header and network traces in the NetFlow, PCAP, TCPdump data format. These tools also support API/plugin interfaces to anonymize data on runtime. Moreover, most of these tools focus on the IP addresses fields in the data and ignore other fields (e.g., application port number) and the payload.
2. Replacement-based anonymization tools: The tools in this category deal mainly with unstructured data. Those tools (e.g., Camouflage, Loganon, loganon, NLM and bsmpseu) replace the sensitive data attributes in the log with some values predefined by the user in what is referred to as the rule file. This rule file contains patterns and is used by the tool to perform pattern matching and to store the conversion state of the anonymization in a look-up table. Some other tools in this category use deterministic encryption and hashing algorithms to achieve this goal in case the conversion state/mapping is not as important, and the analysis does not require remapping the anonymized data to its original state. These tools are complex as they may require the data owner to know the patterns to search for and to manage the rules. Also, these tools are not flexible enough to allow for modification of the privacy and utility levels according to data owner privacy constraints and data processor utility requirements.

SUMMARY

One drawback among existing solutions is that each anonymization solution alone is weak where the one-size-fits-all cases is may hinder usability. In particular, using a single anonymization level for anonymizing data either provides (1) high privacy guarantees while sacrificing the data utility or (2) provides high utility guarantees that render logs usable for analysis but provide lower data privacy levels.

In the real-world, different data owners have different privacy needs such that the one-size-fits-all case of using the same anonymization level for all data is an overly restrictive method. Furthermore, these existing solutions consider a unique data owner as the only user of the anonymization tool and the only participant in the anonymization process, which is not always the case. Additionally, these existing solutions ignore the usability requirements of the data processor as the data processors tend to be the real user of the anonymized data such that the requirements of the data processor should likely be taken into consideration and/or implemented, if not contradicting with the data owners' privacy constraints.

Further, these existing tools cannot handle different data belonging to different data owners/customers. These tools are unable to identify or process multi-tenant data as these existing tools are not designed to anonymize data belonging to different data owners in a coordinated way while meeting each data owner's privacy requirement of corresponding data. These existing tools do not provide a common utility base for multi-tenant data.

Thus, there is a need for mechanisms to adequately protect the data belonging of different data owners/customers, while allowing for the protected data to be usable for analysis tools and techniques. Further, there are no existing systems that allow a user/data owner to fine-tune the anonymized data based on the use case scenarios while preserving the privacy constraints of several data owners. These existing tools are not designed to initiate and manage a negotiation process to deal with privacy/utility requirements from different tenants owning to different parts of the data to achieve the same usability level for a given use case that may require the analysis of data across the different tenants.

The present disclosure advantageously solves at least one problem with existing systems at least in part by advantageously providing a method and system for multi-entity data anonymization and analysis. One or more embodiments described herein may be based at least in part on a security management system configuration.

In one or more embodiments, a system is provided that allows for the establishment of a trusted negotiation about privacy and utility levels of the data collected from different customers/data owners so that the data is anonymized while helping ensure the same and/or minimum usability level required for analysis and/or by a data analysis use case.

In one or more embodiments, the system allows the security management system such as a data analysis engine (i.e., security manager) to cooperate and/or negotiate with different customers before the anonymization process in order to obtain a best and/or at least a minimum utility level for the anonymized data from each customer. The negotiation outcome may include one or more of a set of anonymization primitives, parameters, and keys for different customers that may be used during the anonymization process.

In one or more embodiments, each data item belonging to a given customer is anonymized according to the specific customer's/data owner's needs/requirements so that the customer's privacy requirements are met, while the merging and correlation of the anonymized data from different customers can provide analysis to be performed by the data analysis engine (security management system) as each anonymized data set meets a minimum and sufficient utility level, i.e., the anonymized data set meets a predefined utility criterion or criteria.

According to one aspect of the disclosure, a security management system including at least a first Trusted Execution Environment, TEE, and a common TEE is provided. The first TEE is a secured environment for data associated with a first entity. The common TEE is a secured environment for data associated with any one of a plurality of entities including the first entity. First cryptographic parameters are shared between the first TEE and the first entity. First anonymization parameters are shared between the first TEE and the common TEE. The first anonymization parameters re based at least in part on at least one privacy requirement of the first entity and at least one utility requirement of the security management system. The security management system includes processing circuitry configured to: anonymize, at the first TEE, first data associated with the first entity based at least in part on the first anonymization parameters, analyze, at the common TEE, at least the anonymized first data for performing data investigation, and generate analysis results based at least in part on the analysis of at least the anonymized first data.

According to one or more embodiments of this aspect, the security management system includes a second TEE. The second TEE is a secured environment for data associated with a second entity. Second cryptographic parameters are shared between the second TEE and the second entity. Second anonymization parameters are shared between the second TEE and the common TEE. The second anonymization parameters are different from the first anonymization parameters. The processing circuitry is further configured to: anonymize, at the second TEE, second data associated with the second entity based at least in part on the second anonymization parameters. The analysis of at least the first anonymized data further includes analysis of the second anonymized data for performing the data investigation and correlating the first anonymized data and the second anonymized data.

According to one or more embodiments of this aspect, the anonymizing of the first data at the first TEE is based at least in part on a type of query to be performed as part of the analysis at the common TEE. According to one or more embodiments of this aspect, the first anonymization parameters indicate at least one of a type of anonymization algorithm and which portions of first data to anonymize. According to one or more embodiments of this aspect, the at least one privacy requirement of the first entity includes anonymizing at least two different attributes in the first data differently from each other.

According to one or more embodiments of this aspect, the at least one utility requirement corresponds to a minimum usability level of anonymized data to be analyzed. According to one or more embodiments of this aspect, the processing circuitry is further configured to, at the first TEE: perform a first attestation procedure associated with the first entity, perform a session key agreement with the first entity, receive encrypted first data associated with the first entity, and decrypt the encrypted first data to provide the first data for anonymization. According to one or more embodiments of this aspect, the processing circuitry is further configured to: receive data for a network slice assigned to the first entity and analyze, at the common TEE, the data for the network slice. The generation of analysis results is further based on the analysis of the data for the network slice. According to one or more embodiments of this aspect, the analysis of the anonymized first data and the data for the network slice includes correlating the anonymized first data with the data for the network slice.

According to another aspect of the disclosure, a method implemented in a security management system is provided. The security management system includes at least a first Trusted Execution Environment, TEE, and a common TEE. The first TEE is a secured environment for data associated with a first entity. The common TEE is a secured environment for data associated with any one of a plurality of entities including the first entity. First cryptographic parameters are shared between the first TEE and the first entity. First anonymization parameters are shared between the first TEE and the common TEE. The first anonymization parameters are based at least in part on at least one privacy requirement of the first entity and at least one utility requirement of the security management system. First data associated with the first entity is anonymized at the first TEE based at least in part on the first anonymization parameters. At least the anonymized first data for performing data investigation is analyzed at the common TEE. Analysis results are generated based at least in part on the analysis of at least the anonymized first data.

According to one or more embodiments of this aspect, the security management system includes a second TEE. The second TEE is a secured environment for data associated with a second entity. Second cryptographic parameters are shared between the second TEE and the second entity. Second anonymization parameters are shared between the second TEE and the common TEE. The second anonymization parameters are different from the first anonymization parameters. Second data associated with the second entity is anonymized at the second TEE based at least in part on the second anonymization parameters. The analysis of at least the first anonymized data further includes analysis of the second anonymized data for performing the data investigation and correlating the first anonymized data and the second anonymized data. According to one or more embodiments of this aspect, the anonymizing of the first data at the first TEE is based at least in part on a type of query to be performed as part of the analysis at the common TEE.

According to one or more embodiments of this aspect, the first anonymization parameters indicate at least one of a type of anonymization algorithm and which portions of first data to anonymize. According to one or more embodiments of this aspect, the at least one privacy requirement of the first entity includes anonymizing at least two different attributes in the first data differently from each other. According to one or more embodiments of this aspect, the at least one utility requirement corresponds to a minimum usability level of anonymized data to be analyzed. According to one or more embodiments of this aspect, at the first TEE, a first attestation procedure associated with the first entity is performed, a session key agreement with the first entity is performed, encrypted first data associated with the first entity is received, and the encrypted first data is decrypted to provide the first data for anonymization.

According to one or more embodiments of this aspect, data for a network slice assigned to the first entity is received, the data for the network slice is analyzed at the common TEE, and the generation of analysis results is further based on the analysis of the data for the network slice. According to one or more embodiments of this aspect, the analysis of the anonymized first data and the data for the network slice includes correlating the anonymized first data with the data for the network slice.

According to another aspect of the disclosure, a common Trusted Execution Environment, TEE, within a security management system is provided. The common TEE is configured to provide a secured environment for data for a plurality of entities. The security management system includes a first TEE that is a secured environment for data associated with a first entity and a second TEE that is a secured environment for data associated with a second entity. First anonymization parameters are shared between the first TEE and the common TEE. The first anonymization parameters re based at least in part at least one privacy requirement of the first entity and at least one utility requirement of the security management system. Second anonymization parameters are shared between the second TEE and the common TEE. The second anonymization parameters re based at least in part at least one privacy requirement of the second entity and at least one utility requirement of the security management system. The common TEE is configured to: receive anonymized first data associated with the first entity where the anonymized first data is anonymized based at least in part on the first anonymization parameters. Anonymized second data associated with the second entity is received where the anonymized second data is anonymized based at least in part on the second anonymization parameters. At least the anonymized first data and anonymized second data is analyzed for performing data investigation. The analysis includes at least correlating the anonymized first data and anonymized second data. Analysis results are generated based at least in part on the analysis of at least the anonymized first data and anonymized second data.

According to one or more embodiments of this aspect, the common TEE is further configured to receive data for a network slice assigned to the first entity of the plurality of entities. The correlation and analysis of the at least the anonymized first data and anonymized second data includes correlation and analysis of the data for the network slice.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Security Manager or Security Management System

One concern in launching, for instance, new IoT services is security. To help address this concern, it may be necessary to detect threats in near real-time and to swiftly respond with appropriate actions. Thus, a security management system may be required to manage the different types of data and to monitor data flows coming from various devices such as IoT devices. Security management system may be used in an "as a service" deployment model for IoT context. The security management system is deployed as an extended capability on top of IoT Accelerator Connectivity Management (former Device Connectivity Platform).

On-premise security management system provides a solution for end to end security management, supporting different domains (e.g., device, access network and connectivity, applications and cloud) consisting of different trust anchors and security functions. The security management system provides support for horizontal end to end data management across all domains. Further, the security management system provides the possibility to collect, store and analyze traffic and data from the different layers. Data is collected in the form of security logs or traffic that may be captured from the connectivity layer of a network through probes.

The security management system may perform continuous protection including security analytics, which can provide, using the data, one or more of: security insights and actions, covering vulnerabilities, threats, risks, and fraud events. The security analytics aim for faster response times and shortening the detection time for security and privacy breaches. The security analytics may use rule and machine-learning based analytics for detecting known and unknown threats across different network domains. Further, the security analytics may provide constant visibility to the risk landscape and help to target actions to higher risk areas to reduce the attack surface and/or probability of attack.

The Security management systems may be capable of multi-tenancy/entity support providing capabilities to provide access to all security manager functions and features that occur in the context of a tenant, have per tenant own identity and entitlement management system, thereby helping ensure all events and data are either provider or tenant owned and providing full isolation of tenant data. The security manager may need to anonymize certain sensitive data objects before the security analytics process, for instance, in case data is collected via probes. Often a low complex anonymization process is used in conjunction with common anonymization requirements applicable to all tenants that are enforced by a data processor.

However, while some existing systems may provide for a low complex anonymization process that is used in conjunction with common anonymization requirements that are applied for all tenants, one or more embodiments of the instant disclosure may allow for each tenant to have tenant specific anonymization requirements such that anonymization may be customized to each tenant while still allowing a certain level of usability of the anonymized data for performing analysis. Therefore, one or more embodiments provide for multi-entity data anonymization and analysis that allow for data from each tenant to be anonymized according to tenant specific requirements while still allowing for the anonymized data to be analyzed.

Before describing in detail exemplary embodiments, it is noted that the embodiments reside primarily in combinations of apparatus components and processing steps related to multi-entity data anonymization and analysis. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments, "sharing" of parameters and/or data may generally refer to transmission and/or reception of the parameters and/or data.

In some embodiments described herein, the term "coupled," "connected," and the like, may be used herein to indicate a connection, although not necessarily directly, and may include wired and/or wireless connections.

The term "node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc. The wireless device may generate customer/user specific data that may be anonymized for analysis as described herein.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 1:
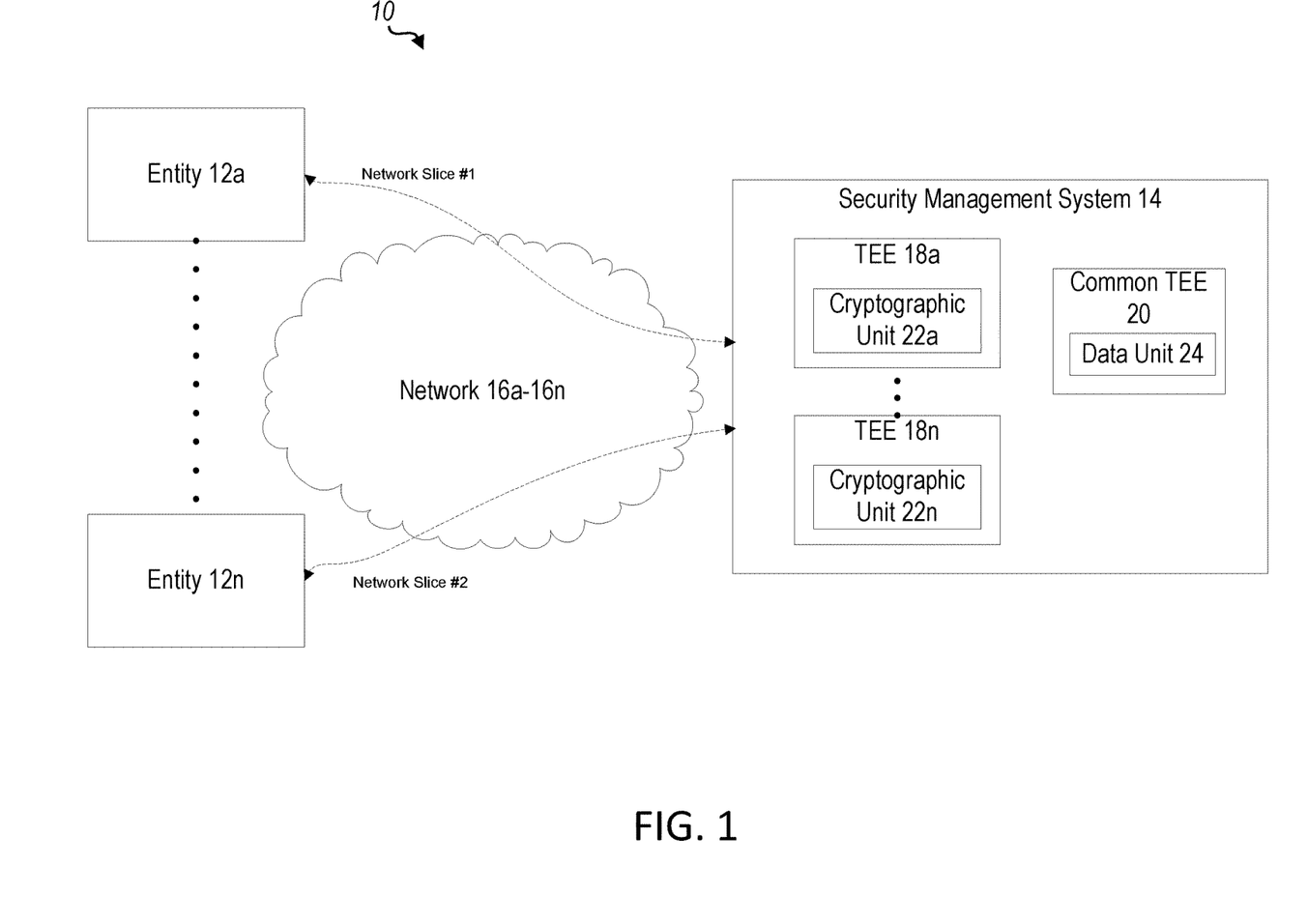
FIG. 1 is a schematic diagram of an exemplary architecture illustrating a system according to the principles of the disclosure.

Referring now to the drawing figures, in which like elements are referred to by like reference numerals, there is shown in FIG. 1 a schematic diagram of a communication system 10, according to an embodiment, which comprises an one or more entities 12a-12n (collectively referred to as entity 12) that are in communication with security management system 14 via one or more networks 16a-16n (collectively referred to as network 16). Entity 12 may correspond to one or more devices (e.g., wireless devices) that are associated with a specific entity/customer where one of more of the devices generate customer data. In one or more embodiments, entity 12 may be allocated a network slice (e.g., predefined communication resources) for communicating with other devices, entities, systems, etc.

Security management system 14 includes one or more Trusted Execution Environment (TEEs) 18a-18n where each TEE 18 is configured to provide a secured environment for data associated with a respective entity 12. For example, TEE 18*a* may be configured to provide a secured environment for data associated with entity 12*a*. TEE 18 includes cryptographic unit 22*a* that is configured to perform one or more TEE 18 functions as described herein. For example, in one or more embodiments, TEE 18 is configured to share (e.g., transmit and/or receive) one or more cryptographic parameters between TEE 18 and entity 12 where these cryptographic parameters are specific to entity 12 such that other cryptographic parameters for other entities 12 may differ. In one or more embodiments, the cryptographic parameters associated with a specific TEE 18 and entity 12 is used to encrypt/decrypt data.

Security management system 14 includes a common TEE 20 that is configured to provide a secured environment for the various entities 12 such as for entity 12*a*-12*n*. For example, the common TEE 20 may send/transmit data/parameters/etc., to the first TEE 18*a* based at least in part on a privacy/utility agreement with the first entity 12*a* associated with the first TEE 18*a*. Similar communication may be performed between the common TEE 20 and other TEEs 18. The common TEE 20 includes data unit 24 that is configured to share anonymization parameters between TEEs 18 and common TEE 18 for anonymizing data at each TEE 18. For example, anonymization parameters (i.e., first anonymization parameters) associated with TEE 18*a* may be shared between TEE 18*a* and common TEE 20 while anonymization parameters (i.e., second anonymization parameters different from the first anonymization parameters) associated with TEE 18*b* may be shared between TEE 18*b* and common TEE 20, etc. The respective anonymization parameters are based at least in part on at least one privacy (i.e., data privacy) requirement of respective entities 12 and at least one utility requirement of the security management system 14. Therefore, in one or more embodiments, various anonymization parameters for various entities are shared between TEEs 18 and common TEE 20 such that each TEE 18 may anonymize respective entity 12 data using respective anonymization parameters.

Figure 2:
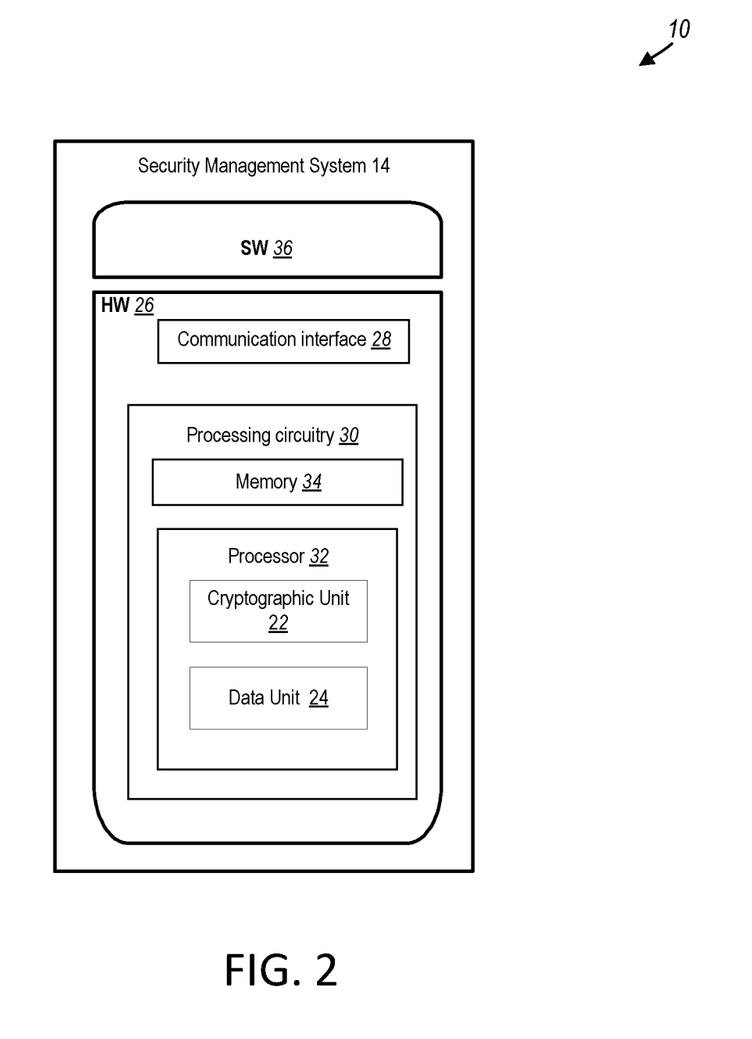
FIG. 2 is a block diagram of a security management system according to one or more embodiments of the present disclosure.

An example implementation in accordance with one or more embodiments, of security management system 14 discussed in the preceding paragraphs will now be described with reference to FIG. 2. Security management system 14 includes hardware (HW) 26 including a communication interface 28 configured to set up and maintain a wired or wireless connection with an interface of a different communication device of the communication system 10. The security management system 14 further comprises processing circuitry 30, which may have storage and/or processing capabilities. The processing circuitry 30 may include a processor 32 and memory 34. In particular, in addition to or instead of a processor, such as a central processing unit, and memory, the processing circuitry 30 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 32 may be configured to access (e.g., write to and/or read from) memory 34, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 30 may be configured to control any of the methods and/or processes described herein and/or to cause such methods, and/or processes to be performed, e.g., by security management system 14. Processor 32 corresponds to one or more processors 32 for performing security management system 14 functions described herein. The security management system 14 includes memory 34 that is configured to store data, programmatic software code and/or other information described herein. In some embodiments, the software 36 that may include instructions that, when executed by the processor 32 and/or processing circuitry 30, causes the processor 32 and/or processing circuitry 30 to perform the processes described herein with respect to security management system 14. The instructions may be software associated with the security management system 14.

The software 36 may be executable by the processing circuitry 30. The processing circuitry 30 of the security management system 14 may include a cryptographic unit 22 that is configured to perform one or more security management system 14 functions described herein such as with respect to data anonymization for analysis. The processing circuitry 30 of the security management system 14 may include a data unit 24 that is configured to perform one or more security management system 14 functions described herein such as with respect to multi-entity data anonymization and analysis.

Figure 3:
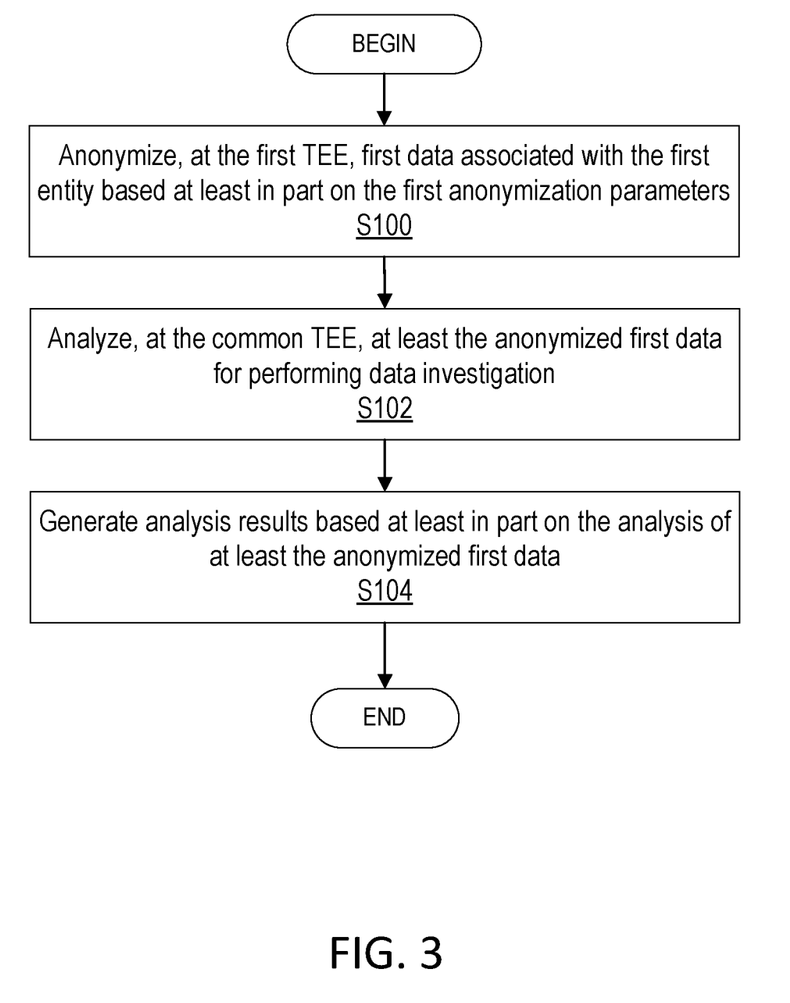
FIG. 3 is a flowchart of an exemplary process in a security management system according to one or more embodiments of the disclosure.

FIG. 3 is flow diagram of an exemplary process in security management system 14 according to one or more embodiments of the present disclosure. In one or more embodiments, a security management system 14 including at least a first TEE 18*a* and a common TEE 20 where the first TEE 18*a* is a secured environment for data associated with a first entity 12*a*, and where the common TEE 20 is a secured environment for data associated with any one of a plurality of entities 12 including the first entity 12*a*, and where first cryptographic parameters are shared between the first TEE 18*a* and the first entity 12*a*, and where first anonymization parameters are shared between the first TEE 18*a* and the common TEE 20, and where the first anonymization parameters re based at least in part on at least one privacy requirement of the first entity 12*a* and at least one utility requirement of the security management system 14. One or more Blocks and/or functions performed by security management system 14 may be performed by one or more elements of security management system 14 such as by cryptographic unit 22 and/or data unit 24 in processing circuitry 30, processor 32, communication interface 28, etc. In one or more embodiments, security management system 14 such as via one or more of processing circuitry 30, processor 32, cryptographic unit 22, data unit 24 and communication interface 28 is configured to anonymize (Block S100), at the first TEE 18 (e.g., 18*a*), first data associated with the first entity 12 (e.g., 12*a*) based at least in part on the first anonymization parameters, as described herein. In one or more embodiments, security management system 14 such as via one or more of processing circuitry 30, processor 32, cryptographic unit 22, data unit 24 and communication interface 28 is configured to analyze (Block S102), at the common TEE 20, at least the anonymized first data for performing data investigation, as described herein. In one or more embodiments, security management system 14 such as via one or more of processing circuitry 30, processor 32, cryptographic unit 22, data unit 24 and communication interface 28 is configured to generate (Block S104) analysis results based at least in part on the analysis of at least the anonymized first data.

According to one or more embodiments, the security management system 14 includes a second TEE 18 (e.g., 18*b*) where the second TEE 18 is a secured environment for data associated with a second entity 12 (e.g., 12*b*) where second cryptographic parameters are shared between the second TEE and the second entity. The second anonymization parameters are shared between the second TEE 18 and the common TEE 20 where the second anonymization parameters are different from the first anonymization parameters. The processing circuitry 30 is further configured to anonymize, at the second TEE 18, second data associated with the second entity 12 based at least in part on the second anonymization parameters. The analysis of at least the first anonymized data further includes analysis of the second anonymized data for performing the data investigation and correlating the first anonymized data and the second anonymized data. The anonymizing of the first data at the first TEE 18 is based at least in part on a type of query to be performed as part of the analysis at the common TEE 20.

According to one or more embodiments, the first anonymization parameters indicate at least one of a type of anonymization algorithm and which portions of first data to anonymize. According to one or more embodiments, the at least one privacy requirement of the first entity 12 includes anonymizing at least two different attributes in the first data differently from each other. According to one or more embodiments, the at least one utility requirement corresponds to a minimum usability level of anonymized data to be analyzed. According to one or more embodiments, the processing circuitry 30 is further configured to, at the first TEE 18: perform a first attestation procedure associated with the first entity 12, perform a session key agreement with the first entity 12, receive encrypted first data associated with the first entity 12, and decrypt to the encrypted first data to provide the first data for anonymization.

According to one or more embodiments, the processing circuitry 30 is further configured to: receive data for a network slice assigned to the first entity 12 and analyze, at the common TEE 20, the data for the network slice where the generation of analysis results is further based on the analysis of the data for the network slice. In one or more embodiments, the network slice is also anonymized using methods/processes described herein such that the analysis results are based on the analysis of the anonymized data for the network slice. According to one or more embodiments, the analysis of the anonymized first data and the data for the network slice includes correlating the anonymized first data with the data for the network slice.

Figure 4:
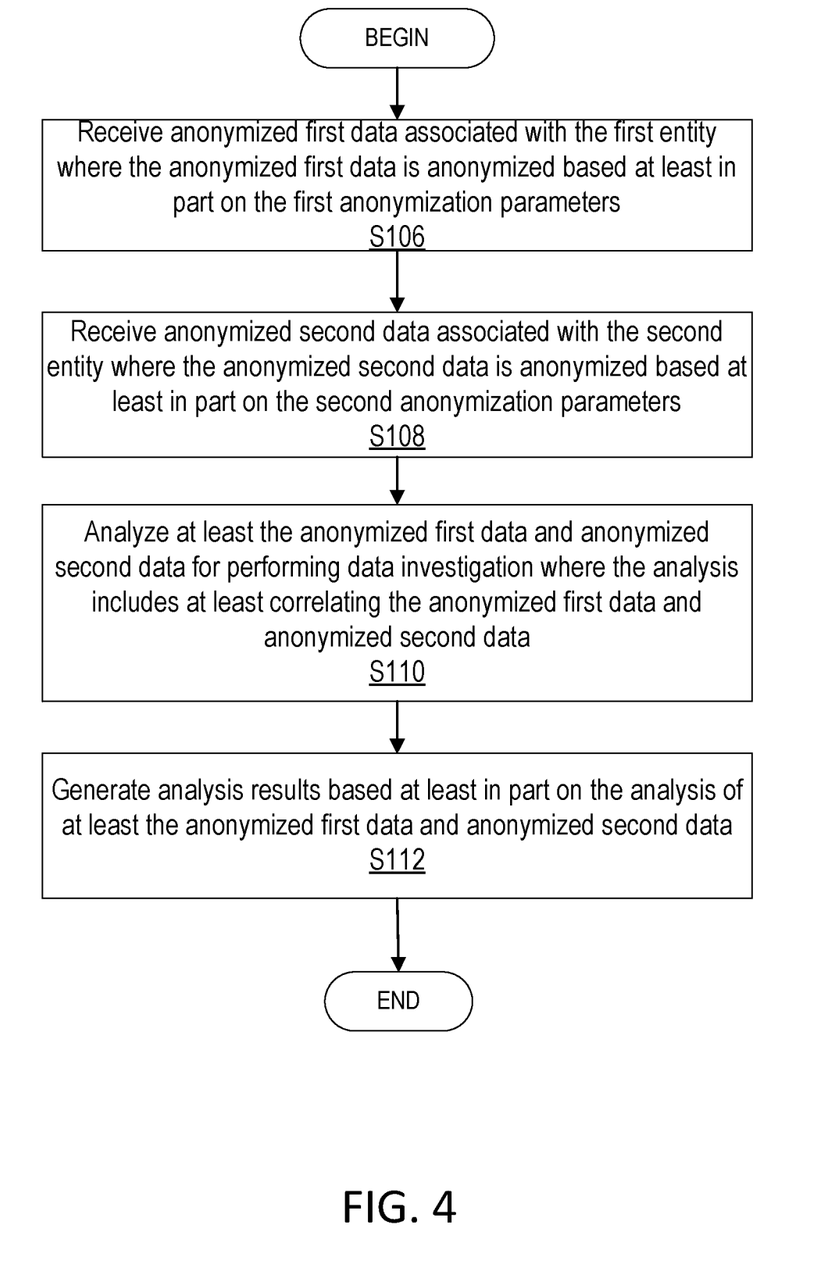
FIG. 4 is a flowchart of an exemplary process in a common TEE according to one or more embodiments of the disclosure.

FIG. 4 is flow diagram of an exemplary process in security management system 14 such as a common TEE 20 according to one or more embodiments of the present disclosure. One or more Blocks and/or functions performed by security management system 14 may be performed by one or more elements of security management system 14 such as by data unit 24 in processing circuitry 30, processor 32, communication interface 28, etc. In one or more embodiments, a common TEE 20 is within a security management system 14 where the common TEE 20 is configured to provide a secured environment for data for a plurality of entities 12. The security management system 14 including a first TEE 18 (e.g., 18a) that is a secured environment for data associated with a first entity 12 (e.g., 12a) and a second TEE (12b) that is a secured environment for data associated with a second entity 12 (e.g., 12b). First anonymization parameters may be shared between the first TEE 18 and the common TEE 20, and first anonymization parameters may be based at least in part at least one privacy requirement of the first entity 12 and at least one utility requirement of the security management system 14. Second anonymization parameters being shared between the second TEE 18 and the common TEE 20. The second anonymization parameters are based at least in part at least one privacy requirement of the second entity 12 and at least one utility requirement of the security management system 14.

In one or more embodiments, security management system 14 such as via one or more of processing circuitry 30, processor 32, data unit 24 and communication interface 28 is configured to receive (Block S106) anonymized first data associated with the first entity 12 where the anonymized first data is anonymized based at least in part on the first anonymization parameters, as described herein. In one or more embodiments, security management system 14 such as via one or more of processing circuitry 30, processor 32, data unit 24 and communication interface 28 is configured to receive (Block S108) anonymized second data associated with the second entity 12 where the anonymized second data is anonymized based at least in part on the second anonymization parameters, as described herein.

In one or more embodiments, security management system 14 such as via one or more of processing circuitry 30, processor 32, data unit 24 and communication interface 28 is configured to analyze (Block S110) at least the anonymized first data and anonymized second data for performing data investigation where the analysis includes at least correlating the anonymized first data and anonymized second data, as described herein. In one or more embodiments, security management system 14 such as via one or more of processing circuitry 30, processor 32, data unit 24 and communication interface 28 is configured to generate (Block S112) analysis results based at least in part on the analysis of at least the anonymized first data and anonymized second data.

According to one or more embodiments, the common TEE 20 is further configured to receive data for a network slice assigned to the first entity 12 of the plurality of entities 12. The correlation and analysis of the at least the anonymized first data and anonymized second data includes correlation and analysis of the data for the network slice.

Figure 5:
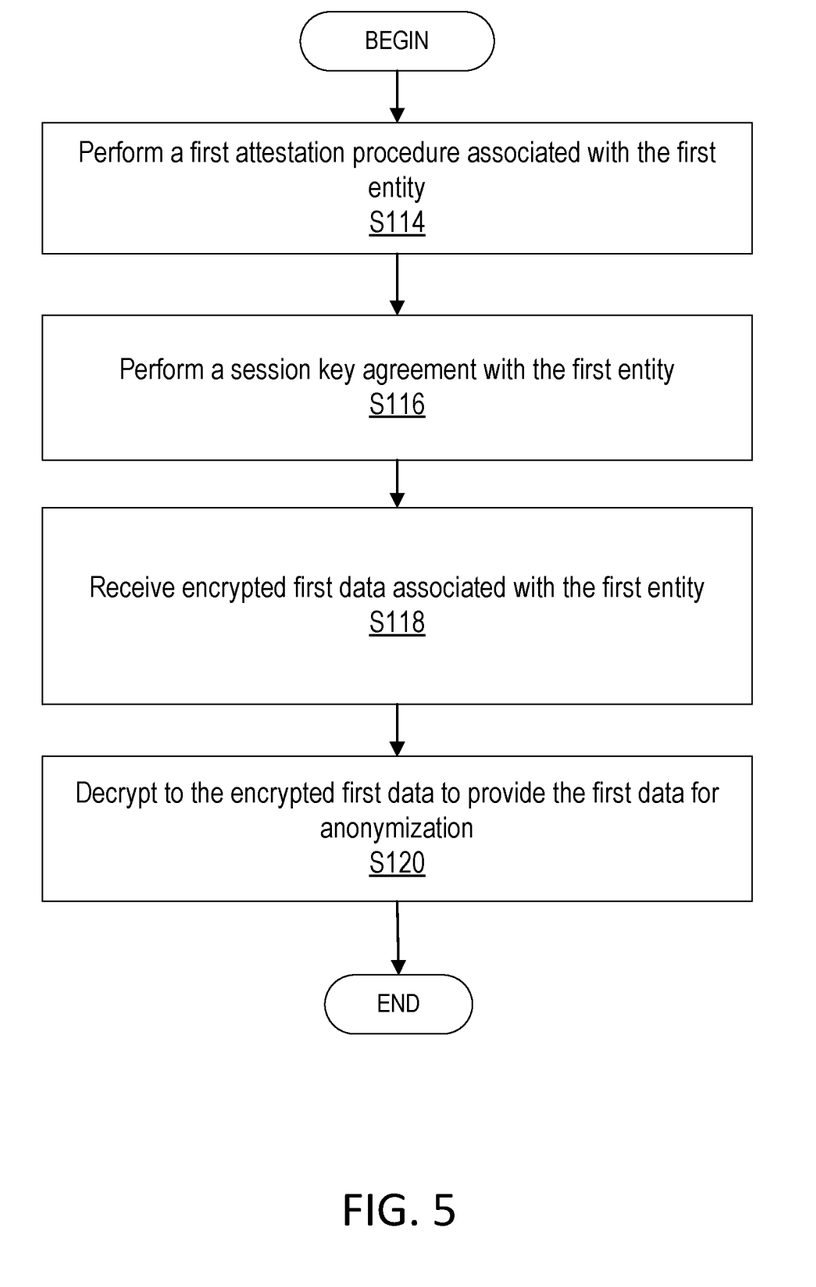
FIG. 5 is a flowchart of an exemplary process in a TEE according to one or more embodiments of the disclosure.

FIG. 5 is flow diagram of an exemplary process in security management system 14 according to one or more embodiments of the present disclosure. One or more Blocks and/or functions performed by security management system 14 may be performed by one or more elements of security management system 14 such as by cryptographic unit 22 in processing circuitry 30, processor 32, communication interface 28, etc. In one or more embodiments, TEE 18 operating within security management system 14 such as via one or more of processing circuitry 30, processor 32, cryptographic unit 22 and communication interface 28 is configured to perform (Block S114) a first attestation procedure associated with the first entity 12, as described herein. In one or more embodiments, TEE 18 operating within security management system 14 such as via one or more of processing circuitry 30, processor 32, cryptographic unit 22 and communication interface 28 is configured to perform (Block S116) a session key agreement with the first entity 12, as described herein.

In one or more embodiments, TEE 18 operating within security management system 14 such as via one or more of processing circuitry 30, processor 32, cryptographic unit 22 and communication interface 28 is configured to receive (Block S118) encrypted first data associated with the first entity 12, as described herein. In one or more embodiments, TEE 18 operating within security management system 14 such as via one or more of processing circuitry 30, processor 32, cryptographic unit 22 and communication interface 28 is configured to decrypt (Block S120) the encrypted first data to provide the first data for anonymization.

Having generally described arrangements for multi-entity data anonymization and analysis, details for these arrangements, functions and processes are provided as follows, and which may be implemented by the security management system 14, TEE 18 and common TEE 20.

In one or more embodiments, a system and a method that allows to establish a trusted negotiation about privacy and utility levels of the data collected from different customers/entities 12 so that the data is anonymized while ensuring the same usability level or at least a minimum usability level required by a given data analysis use case is provided.

The security management system 14 is configured to cooperate with the customer anonymization processes to obtain the best utility (e.g., at least a minimum level or the highest common level across all anonymized data) by cross-customers data/traffic analysis in a trusted environment and protecting privacy/sensitive information present in device (e.g., IoT device) data belonging to the different customers/entities 12.

Figure 6:
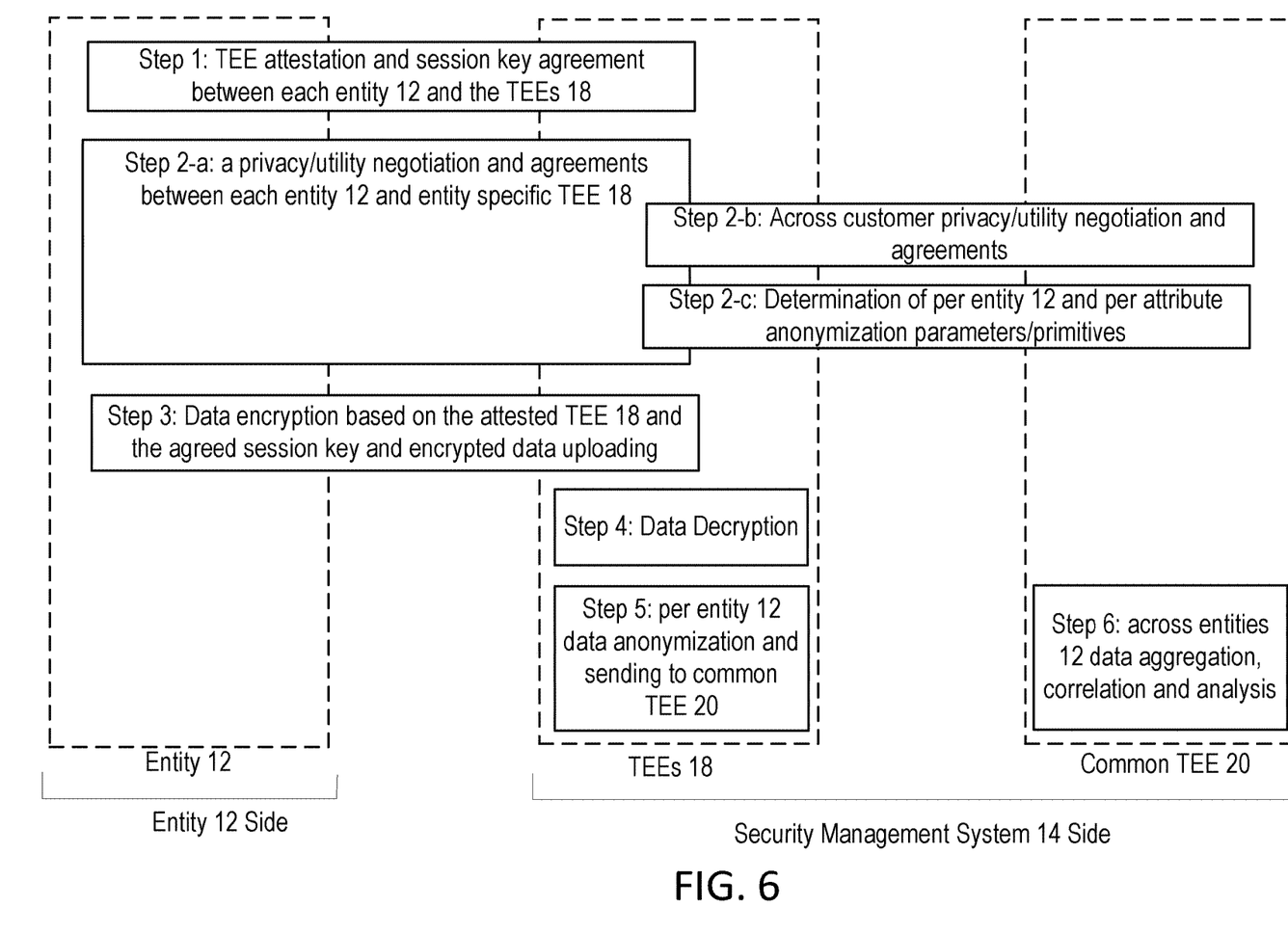
FIG. 6 is a flowchart of an exemplary process according to one or more embodiments of the disclosure.

FIG. 6 is a diagram illustrating describes the high-level interactions between entity 12, TEE 18 and common TEE 20. Step 1 and Step 2*a-c* are related to negotiations between each entity 12 and the security analyst side (e.g., TEE 18 and common TEE 20) of security management system 14 towards performing attestation, session key agreements and agreements on the parameters concerning the privacy-level required by the data owner/entity 12 side and the common utility-level required from the security management system 14. In other words, utility requirements are negotiated and/or based on a trade-off between utility and privacy for a specific entity 12. For example, such agreements may be negotiated, agreed and/or based at least in part on the interactions between each entity 12's needs for privacy and security management needs for utility.

Once these agreements are established, Step 3 relates to the data encryption at the customer/entity 12 side, for date to be uploaded securely on the corresponding TEE 18 for the same entity 12. Step 5 occurs at the per-customer trusted TEE 18 where the data is decrypted in the secure trusted environment and anonymized according to the agreed parameters from Step 2. Once anonymization has been performed at the per-customer TEE 18, the anonymized data is transmitted to the common TEE 20 where per-customer anonymized data may be aggregated, correlated and analyzed. Therefore, tuned anonymization rooted in the first state/level TEEs 18 and then deanonymization per entity in the second stage/common TEE 20 stage may be provided according to one or more embodiments described herein.

Figure 7:
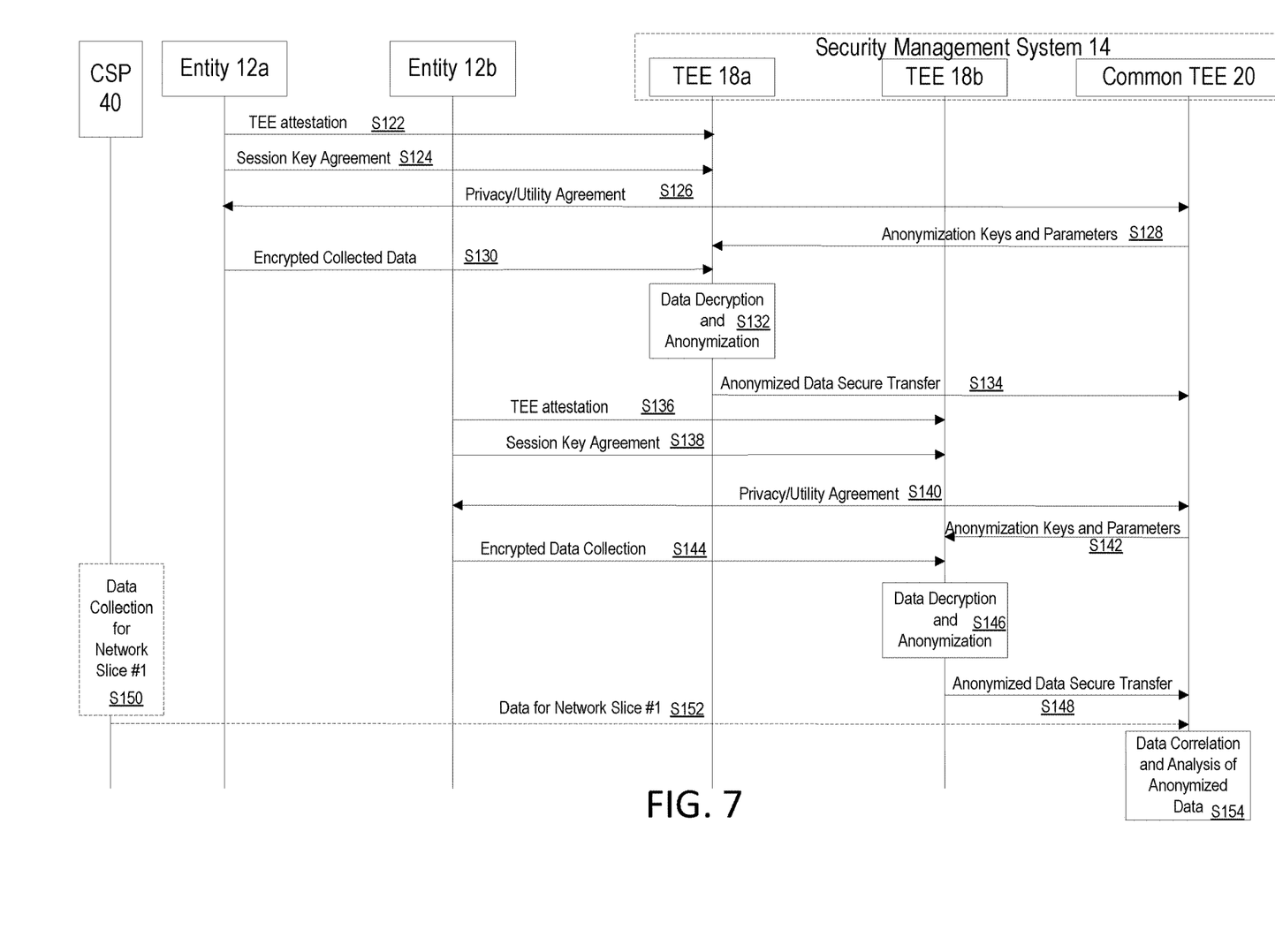
FIG. 7 is a signaling diagram according to one or more embodiments of the disclosure.

FIG. 7 is a diagram illustrating the context of a use case according to one or more embodiments of the disclosure. In one or more embodiments, different customers/entities 12 have negotiated different network slices with the network operators. For example, entity 12*a* communicates with network 16 using network slice 13*a* while entity 12*n* communicates with network 16 using network slice 13*n*. In this context, security management system 14 is collecting data from the entities 12 (e.g., IoTA/DCP) which is anonymized before being forwarded to perform analysis at common TEE that may be on behalf of entities 12 or associated customers. As illustrated in FIG. 7, security management system 14 may probe one or more parts/locations of network 16 to collect entity 12 data from the network 16.

In one or more embodiments, a trusted environment is provided by security management system 14 where various TEEs 18 are used to isolate different contexts from different customers/entities 12. In one or more embodiments, the configuration described herein advantageously provides a common TEE 20 (i.e., common trusted TEE 20), which can be used to process and correlate the anonymized data. At the entities 12, hardware and software used for TEE attestation and negotiation of the privacy/utility levels is provided.

Note that the level of utility of the customer data may be a function of the query q (i.e., analysis at common TEE 20) being performed on the data. For example, if the query is to verify the co-residency for customer's VM1, in this case the host related info, e.g., Host ID and VM IDs of device(s) at entity 12, may need to be pseudo-anonymized, in order to be able to verify and follow the VM1 creation, resting and reloading, migration from one host to another, etc. In this case, the Host's IP and different VMs' IPs can be anonymized, i.e., encrypted as this data may be irrelevant to the request. On the other hand, if the request is to verify the VM1's IPs reachability from another VMs or network topology verification, then the IPs and their relationship may need to be preserved for utility, in this case there may be a need for prefix preserving anonymization for IPs In other words, the privacy/utility level agreement may include and/or define different privacy/utility levels (i.e., different anonymization parameters) for use with different queries. To cover this use case, the type of query can be shared between entity 12 and security management system 14, then privacy/utility level agreement may be considered a privacy/utility level agreement for different query types. In this case, a common set of anonymization primitives/parameters is defined for different query types. Upon reception of queries of different types at the security management system 14, the minimum common denominator for all the query types may be agreed upon between entity 12 and security management system 14 to be used. Security management system 14 then sends query type, qt1, to the TEE 18*a* where TEE 18*a* decrypts the data and anonymize according to qt1 type and sends the anonymized data to the common TEE 20 for further evaluation.

The interactions between entity 12*a*, entity 12*b*, TEE 18*a*, TEE 18*b* and common TEE 20 are illustrated in the signaling diagram of FIG. 7. Entity 12*a* is configured to provide TEE attestation to TEE 18*a* (Block S122). In one or more embodiments, cascading attestation may be performed where the common TEE 20 attest to the TEEs 18, i.e., entity 12 specific TEEs 18, such that the TEE attestation in Block S122 may include properties (attributes) from the attest report it got from the common TEE 20. In other words, the common TEE-entity TEE attestation procedure results in a secure channel between the common TEE 20 and the various TEEs 18. In one or more embodiment, authentication instead of attestation may be performed between the common TEE 20 and TEEs 18 to create the secure channel. In some embodiments, authentication may correspond to attestation without the attestor sending any attributes beyond the implicit confirmation that the private keys used to signal the attestation report are known.

Entity 12*a* is configured to provide a session key agreement to TEE 18*a* (Block S124). The session key agreement may allow the TEE 18 to decrypt data received from entity 12. Entity 12*a* and Common TEE 20 and/or security management system 14 negotiate and agree upon a privacy level and utility level for entity 12*a*'s data (Block S126). In one or more embodiments, the privacy level may correspond to a minimum and/or predefined amount of anonymization for entity 12's data. For example, the privacy level may require that certain predefined types of entity 12's data be anonymized while other types of data may not need to be anonymized. In other words, the privacy level may be specific an entity such as entity 12*a*. In one or more embodiments, the utility level may correspond to a minimum and/or predefined amount of usability of the anonymized data. For example, the utility level may require that certain predefined types of entity 12's data still be usable for analysis. In other words, the utility level may be specific to the security management system 14.

Common TEE 20 is configured to transmit anonymization keys and parameters to TEE 18*a* where the anonymization parameters are used to anonymize the data at TEE 18*a* according to the agreed upon level(s) of privacy/utility from Block S126 (Block S128). Entity 12*a* is configured to encrypt collected data (i.e., entity 12*a* data) and transmit the encrypted collected data to TEE 18*a* (Block S130). TEE 18*a* is configured to decrypt the receive data and perform anonymization of the data using the anonymization parameters from Block S128 (Block S132). TEE 18*a* is configured to transmits/transfer anonymized data to the common TEE 20 such as using a secured channel and/or transmission (Block S134). The general functions of Blocks S136-S148 correspond to Blocks S122-S134 except that Blocks S136-S148 are performed with respect to entity 12*b*, TEE 18*b* and common TEE 20.

In one or more embodiments, one or more cloud service providers (CSP) 40 may optionally collect (Block S150) data for network slice #1 that may be assigned and/or associated with entity 12*a*. For example, CSP 40 may monitor network 16 for traffic from and/or associated with entity 12*a* and may collect this data. In one or more embodiments, CSP 40 may optionally provide/transmit (Block S152) data collected from network slice #1 that may be assigned and/or associated with entity 12*a* to common TEE 20 for use during the correlation and/or analysis of the anonymized data. In one or more embodiments, the network slice data may be anonymized before analysis where the anonymization may be performed by common TEE 20, for example, or by another entity in system 10. While not shown in FIG. 7, the one or more CSPs 40 may also collect data for one or more other entities 12 and may transmit the collected to the common TEE 20 for correlation and/or analysis.

In one example, in some embodiments, some security management system 14 security verifications may be need information about the virtual or physical infrastructure provided by the network operator (or CSP 40). The information about the virtual or physical infrastructure may be needed to verify that entity 12*a*'s VMs are not co-located with another entity's VMs (e.g., competitor's VMs). In this example, the security management system 14 may need to receive information from entity 12 and also information about entity 12's network slice from CSP 40 in order to be able to analyze the co-location requirements (e.g., query).

Common TEE 20 is configured to perform correlation and analysis (Block S154) of anonymized data where such correlation and analysis may, in some embodiments, include correlation and/or analysis of network slice data.

Therefore, in one or more embodiments, one or more of the following are provided:
A system and a method that allows to establish a trusted negotiation about privacy and utility levels of the data collected from different customers/entities 12 so that the data is anonymized while ensuring the same and/or a minimum and/or predefined usability level required by a given data analysis use case.
The data items belonging to different customers/entities 12 are anonymized according to the customer's/entity 12's individual needs and the customer's privacy requirements while still allowing for differently anonymized data to be analyzed by the common TEE 20 such as to satisfy a query.

In one or more embodiments, TEEs 18 are used to isolate different contexts from different entities 12 and one common TEE 20 is used to process and correlate the anonymized data. This configuration of TEEs 18 and the common TEE 20 advantageously allows the security management system 14 to provide distinct anonymization approaches with different utility and privacy levels anchored in hardware security (i.e., TEE) for different entities 12.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A security management system including at least a first Trusted Execution Environment, TEE, a second TEE and a common TEE, the first TEE being a secured environment for data associated with a first entity, the common TEE being a secured environment for data associated with any one of a plurality of entities including the first entity, first cryptographic parameters being shared between the first TEE and the first entity, first anonymization parameters being shared between the first TEE and the common TEE, the first anonymization parameters being based at least in part on at least one privacy requirement of the first entity and at least one utility requirement of the security management system, the second TEE being a secured environment for data associated with a second entity, second cryptographic parameters being shared between the second TEE and the second entity, second anonymization parameters being shared between the second TEE and the common TEE, the second anonymization parameters being different from the first anonymization parameters, the security management system comprising processing circuitry configured to:
anonymize, at the first TEE, first data associated with the first entity based at least in part on the first anonymization parameters;
anonymize, at the second TEE, second data associated with the second entity based at least in part on the second anonymization parameters;
analyze, in anonymized form and at the common TEE, at least the anonymized first data and the second anonymized data for performing data investigation, the analysis including correlating the first anonymized data and the second anonymized data; and
generate analysis results based at least in part on the analysis.

2. The security management system of claim 1, wherein the anonymizing of the first data at the first TEE is based at least in part on a type of query to be performed as part of the analysis at the common TEE.

3. The security management system of claim 1, wherein the first anonymization parameters indicate at least one of a type of anonymization algorithm and which portions of first data to anonymize.

4. The security management system of claim 1, wherein the at least one privacy requirement of the first entity includes anonymizing at least two different attributes in the first data differently from each other.

5. The security management system of claim 1, wherein the at least one utility requirement corresponds to a minimum usability level of anonymized data to be analyzed.

6. The security management system of claim 1, wherein the processing circuitry is further configured to, at the first TEE:
perform a first attestation procedure associated with the first entity;
perform a session key agreement with the first entity;
receive encrypted first data associated with the first entity; and
decrypt the encrypted first data to provide the first data for anonymization.

7. The security management system of claim 1, wherein the processing circuitry is further configured to:
receive data for a network slice assigned to the first entity;
analyze, at the common TEE, the data for the network slice; and
the generation of analysis results being further based on the analysis of the data for the network slice.

8. The security management system of claim 2, wherein the analysis of the anonymized first data and the data for the network slice includes correlating the anonymized first data with the data for the network slice.

9. A method implemented in a security management system, the security management system including at least a first Trusted Execution Environment, TEE, a second TEE and a common TEE, the first TEE being a secured environment for data associated with a first entity, the common TEE being a secured environment for data associated with any one of a plurality of entities including the first entity, first cryptographic parameters being shared between the first TEE and the first entity, first anonymization parameters being shared between the first TEE and the common TEE, the first anonymization parameters being based at least in part on at least one privacy requirement of the first entity and at least one utility requirement of the security management system,, the second TEE being a secured environment for data associated with a second entity, second cryptographic parameters being shared between the second TEE and the second entity, second anonymization parameters being shared between the second TEE and the common TEE, the second anonymization parameters being different from the first anonymization parameters, the method comprising:
anonymizing, at the first TEE, first data associated with the first entity based at least in part on the first anonymization parameters;

anonymizing, at the second TEE, second data associated with the second entity based at least in part on the second anonymization parameters;

analyzing, in anonymized form and at the common TEE, at least the anonymized first data and the second anonymized data for performing data investigation, the analysis including correlating the first anonymized data and the second anonymized data; and generating analysis results based at least in part on the analysis.

10. The method of claim 9, wherein the anonymizing of the first data at the first TEE is based at least in part on a type of query to be performed as part of the analysis at the common TEE.

11. The method of claim 9, wherein the first anonymization parameters indicate at least one of a type of anonymization algorithm and which portions of first data to anonymize.

12. The method of claim 9, wherein the at least one privacy requirement of the first entity includes anonymizing at least two different attributes in the first data differently from each other.

13. The method of claim 9, wherein the at least one utility requirement corresponds to a minimum usability level of anonymized data to be analyzed.

14. The method of claim 9, further comprising, at the first TEE:
performing a first attestation procedure associated with the first entity;
performing a session key agreement with the first entity;
receiving encrypted first data associated with the first entity; and
decrypting the encrypted first data to provide the first data for anonymization.

15. The method of claim 9, further comprising:
receiving data for a network slice assigned to the first entity;
analyzing, at the common TEE, the data for the network slice; and
the generation of analysis results being further based on the analysis of the data for the network slice.

16. The method of claim 15, wherein the analysis of the anonymized first data and the data for the network slice includes correlating the anonymized first data with the data for the network slice.

17. A common Trusted Execution Environment, TEE, within a security management system, the common TEE configured to provide a secured environment for data for a plurality of entities, the security management system including a first TEE that is a secured environment for data associated with a first entity and a second TEE that is a secured environment for data associated with a second entity, first anonymization parameters being shared between the first TEE and the common TEE, the first anonymization parameters being based at least in part at least one privacy requirement of the first entity and at least one utility requirement of the security management system, second anonymization parameters being shared between the second TEE and the common TEE, the second anonymization parameters being based at least in part at least one privacy requirement of the second entity and at least one utility requirement of the security management system, the common TEE configured to:

receive anonymized first data associated with the first entity, the anonymized first data being anonymized based at least in part on the first anonymization parameters;

receive anonymized second data associated with the second entity, the anonymized second data being anonymized based at least in part on the second anonymization parameters;

analyze, in anonymized form, at least the anonymized first data and anonymized second data for performing data investigation, the analysis including at least correlating the anonymized first data and anonymized second data; and generate analysis results based at least in part on the analysis of at least the anonymized first data and anonymized second data.

18. The common TEE of claim 17, wherein the common TEE is further configured to:
receive data for a network slice assigned to the first entity of the plurality of entities; and
the correlation and analysis of the at least the anonymized first data and anonymized second data including correlation and analysis of the data for the network slice.

* * * * *